United States Patent [19]
Thomas et al.

[11] 3,961,642
[45] June 8, 1976

[54] FIRE HYDRANT VALVE ROD COUPLING

[75] Inventors: David F. Thomas, West St. Paul; Harold A. Berglund, Afton, both of Minn.

[73] Assignee: Waterous Company, South St. Paul, Minn.

[22] Filed: Mar. 10, 1975

[21] Appl. No.: 556,782

[52] U.S. Cl. .............................. 137/272; 137/797; 403/2; 403/312
[51] Int. Cl.² ...................... E03B 9/14; F16D 1/00
[58] Field of Search .............. 403/2, 41, 312; 285/4; 52/98; 137/68, 272

[56] References Cited
UNITED STATES PATENTS

| | | | |
|---|---|---|---|
| 1,944,777 | 1/1934 | Banks | 403/2 |
| 2,018,455 | 10/1935 | Lofton | 137/272 X |
| 2,309,238 | 1/1943 | Corey | 403/2 |
| 3,586,019 | 6/1971 | Thomas et al. | 137/68 |

*Primary Examiner*—Martin P. Schwadron
*Assistant Examiner*—Richard Gerard
*Attorney, Agent, or Firm*—Burd, Braddock & Bartz

[57] ABSTRACT

A fire hydrant is designed to break away at the point of the coupling between the upper and lower standpipes when hit by a moving vehicle or the like, to reduce the chance for damage to the hydrant, the vehicle and possibly to the occupants of the vehicle. A valve push rod extends from a valve operating nut at the top of the hydrant down to operable connection with a hydrant valve so that the valve can be opened when water is to be delivered through the hydrant. To provide a breakaway connection for the push rod, a semi-cylindrical frangible coupling sleeve connects an upper valve rod section to a lower valve rod section in about the same horizontal plane as the upper and lower standpipes are coupled to each other. Then when the upper standpipe is broken away from the lower standpipe, the frangible coupling sleeve will also break, allowing separation of the upper valve rod section from the lower valve rod section without substantial danger of damage to the hydrant. To prevent misalignment of the upper rod section with the lower rod section in the event of the accidental rupture of the frangible coupling sleeve, a semi-cylindrical coupling sleeve is bolted to the bottom portion of the upper rod section opposite the frangible coupling sleeve and is provided with a downwardly opening slot to ride on a stud extending outwardly through the upper portion of the lower valve rod section from its position where it holds the frangible coupling sleeve in fixed relationship to that upper portion of the lower valve rod section.

4 Claims, 6 Drawing Figures

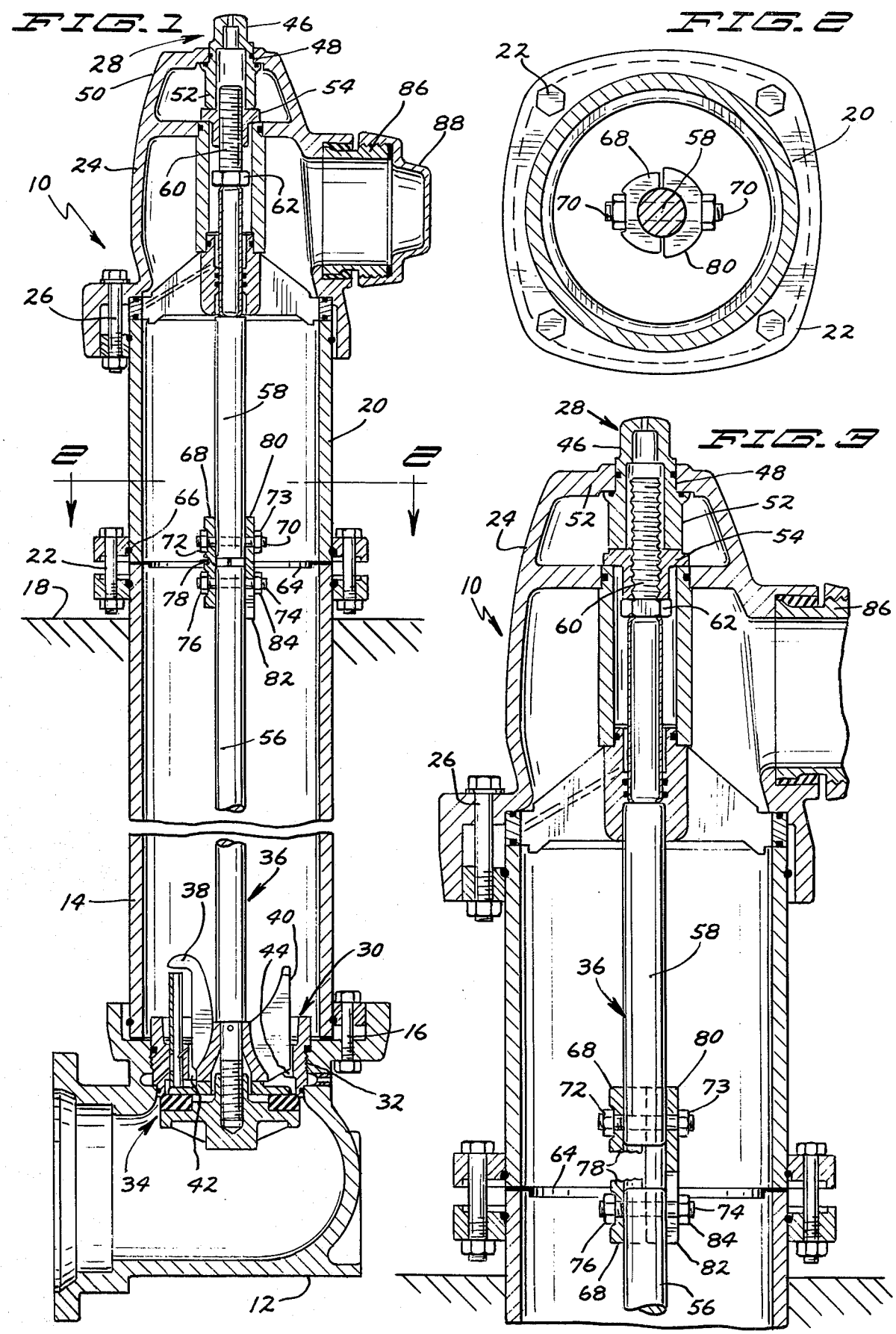

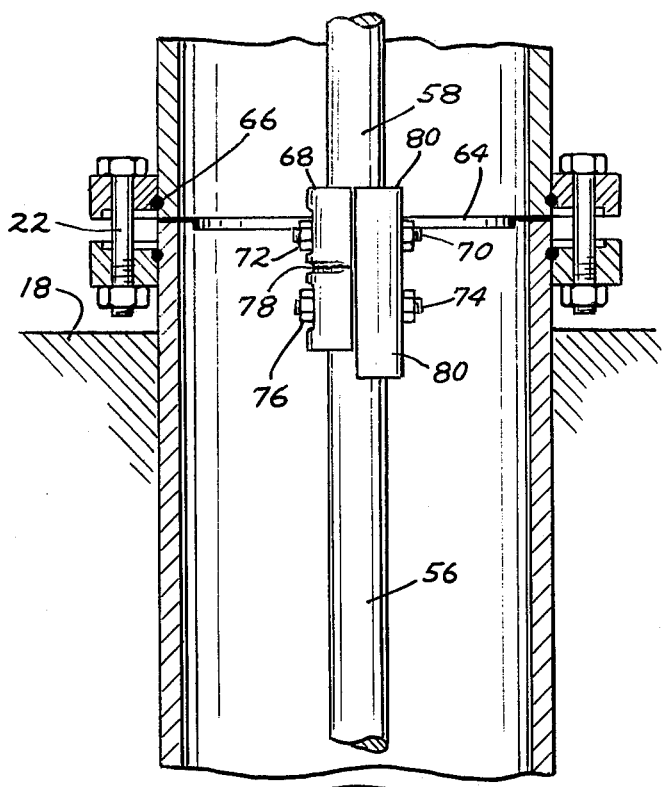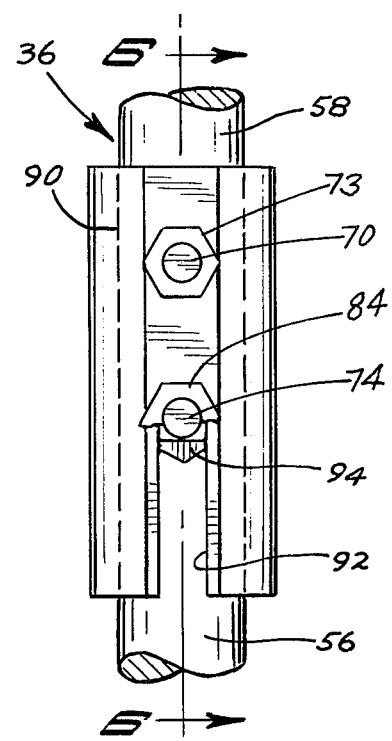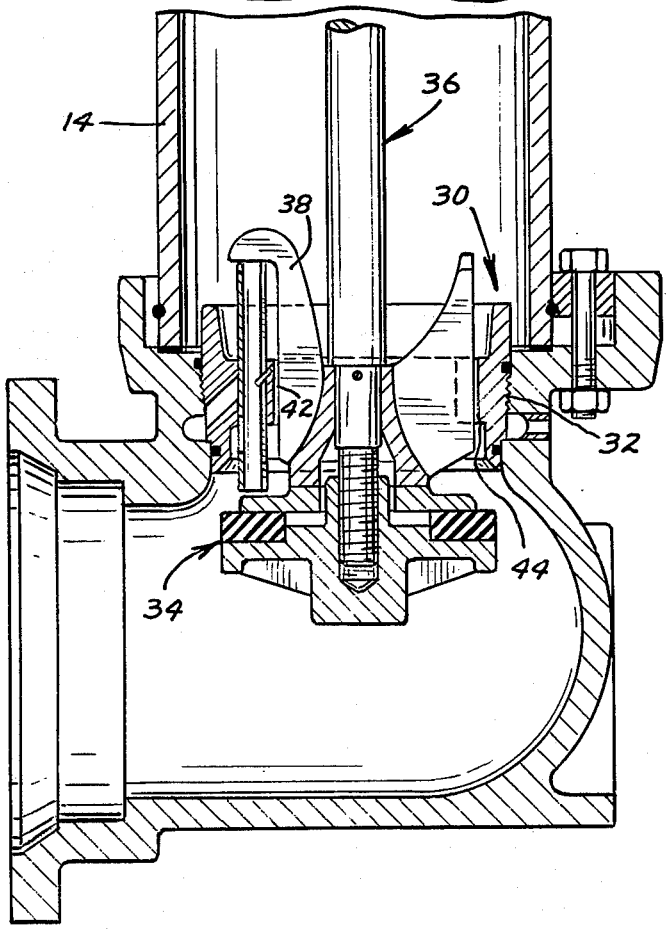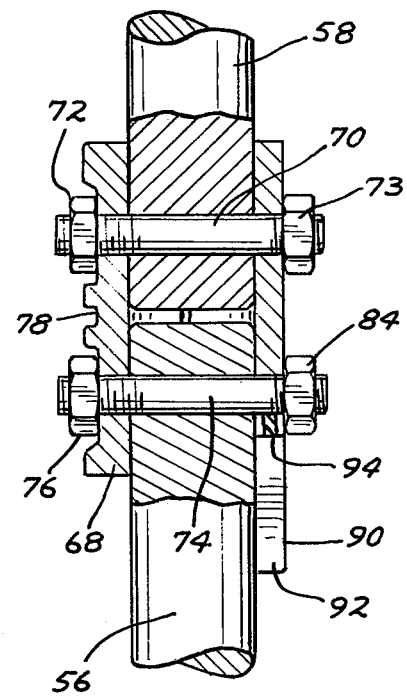

FIRE HYDRANT VALVE ROD COUPLING

BACKGROUND OF THE INVENTION

Over a long period of years, most fire hydrants were produced with heavy metal casings of cast iron or the like which were designed to withstand the shock of forces tending to knock them over. When such hydrants were struck by moving vehicles with sufficient force, not only were the hydrants damaged beyond repair, the vehicle also badly damaged, and the occupants of the vehicle often seriously injured, but it was, more often than not, necessary to dig down around the standpipe to the water main so that the damaged standpipe, valve seat, valve, or the like could be repaired or replaced. This meant the hydrant and the main back to the first cutoff valve were out of service for extended periods.

To substantially prevent this damage and reduce repair time, we have developed a fire hydrant having a lower standpipe and a lower section of valve rod extending to substantially ground level. An upper standpipe and an upper section of valve rod are each conncted to their respective lower counterparts in such a manner that they break away under impact from a moving vehicle or the like, thus minimizing the damage to both the upper and lower portions of the hydrant, to the moving impacting vehicle, and to any occupants thereof. By having this breakaway point at substantially the ground surface, and by providing novel means of coupling the upper and lower portions to each other, it is possible to repair the hydrant without digging it up in order to replace the broken parts. Such repairs can often be made in a matter of minutes.

One form of this structure is illustrated and described in our U.S. Pat. No. 3,586,019 for FIRE HYDRANT issued to our assignee, Waterous Company, on June 22, 1971.

In hydrants such as those illustrated in our patent, the valve is opened by forcing it straight down against the pressure of the water in the main to open the hydrant to flow of water therethrough, and is closed by drawing up on the valve rod to bring the valve up in contact with its seat so that it can be again held closed by the force of the water in the main and by a valve operating nut assembly and the valve rod. Should excessive force be exerted on the valve operating nut after the valve is firmly in contact with the valve seat, through carelessness or abuse, or because a pebble lodged between the valve and seat, for example, it was possible to break the frangible coupling between the upper and lower valve rod sections. Then the rod sections can become misaligned, and/or, when the valve operating nut is rotated in direction to open the valve, the upper secton of the valve rod can rotate with the operating nut assembly and not descend. In either situation, force would not be exerted on the lower valve rod section, and the valve would not open, thus causing failure of the hydrant for its intended function during an emergency situation, for example.

BRIEF SUMMARY OF INVENTION

In a fire hydrant having an upper standpipe designed to break away from a lower standpipe and an upper valve rod section designed to break away from a lower valve rod section upon violent impact, a coupling is provided between the two rod sections which will allow the necessary breakaway of the coupling sections with respect to each other, but will maintain axial alignment of the two sections one with the other for so long as the sections do not move apart from each other farther than the maximum operating distances between open and closed condition of the valve which the rod controls. This coupling also retains the ability of the two valve rod sections to transmit and receive torque loads to and from each other within the same operating range.

This is accomplished by providing a first semi-cylindrical frangible coupling sleeve bolted to a lower end portion of the upper valve rod section and to an upper end portion of the lower valve rod section; and by providing a non-frangible oppositely disposed semi-cylindrical coupling sleeve firmly bolted to one of the two sections and slidably mounted to a radial projection or retention means extending outwardly from the other of the sections.

IN THE DRAWINGS

FIG. 1 is a vertical sectonal view through a fire hydrant showing the valve rod coupling of the invention in its normal operating position with relationship to an undamaged hydrant;

FIG. 2 is a horizontal sectional view taken on the line 2—2 in FIG. 1;

FIG. 3 is a vertical sectional view of the hydrant of FIG. 1 but showing an upper section of the valve rod in its uppermost position and showing s frangible valve rod coupling sleeve in its broken condition;

FIG. 4 is a vertical sectional view of a portion of the fire hydrant as seen in FIG. 1 but with the upper rod section, and a lower rod section cooperating, after fracture of the frangible rod coupling sleeve, to move a valve from its seat to open the hydrant to flow of water;

FIG. 5 is a fragmentary view of upper and lower sections of a valve rod showing a modified form of coupling; and FIG. 6 is a vertical sectional view taken on the lines 6—6 in FIG. 5.

DESCRIPTION OF PREFERRED EMBODIMENTS

In accordance with a first form of the invention as seen in FIGS. 1 through 4, a fire hydrant 10 includes a bottom fitting 12, connected to a water main (not shown); a lower standpipe 14 connected to the bottom fitting as at 16 and extending to position slightly above the ground line 18; an upper standpipe 20 connected to the lower standpipe as at 22; and a nozzle section 24 connected to the upper standpipe as at 26, and including a valve operating assembly 28.

The details of the construction of these elements are clearly set out in our U.S. Pat. No. 3,586,019.

A valve seat 30 is threadably mounted in bottom fitting 12 as at 32, and a hydrant valve 34 is vertically slidably mounted with respect to this valve seat 30 and operates to open and close the water supply to the hydrant. For this purpose, a main valve control rod 36 extends from hydrant valve 34 to the valve operating assembly 28. The details of the operation of this valve 34 with respect to the valve seat 30 are unimportant to the operation of the present invention, but are fully disclosed in our patent. It is sufficient to the understanding of this invention to know that the valve 34 is provided with vertically upstanding webs 38 and 40 which are slidably mounted with respect to projecting channels 42 and 44, respectively, of the valve seat 30 thus to respectively prevent any relative rotative movement between the valve 34 and the valve seat 30.

The valve operating assembly 28 includes a valve operating nut 46 rotatably mounted as at 48 in an upper wall 50 of the nozzle section 24. This operating nut 46 includes an upper nut section 52 of cast iron to provide the strength needed for wrenching and a lower nut section 54 made of brass and keyed to rotate with the upper section.

Main valve control rod 36 includes a lower valve rod section 56 integrally connected with the hydrant valve 34, and an upper valve rod section 58 which includes an externally threaded upper end portion 60 which is threadably mounted in the lower nut section 54 of the valve operating nut 46. Thus when a wrench is applied to operating nut 46 and the nut is rotated, the valve control rod 36 is forced downwardly or upwardly depending upon the direction of rotation of the operating nut. A top stop nut 62 is provided at the bottom of the threaded upper end portion 60 of the upper valve rod section 58 to positively limit the travel of th valve control rod 36, to prevent damage to the hydrant through carelessness or abuse.

As shown in our patent, an annular gasket 64 is positioned between a lowermost end of upper standpipe 20 and an uppermost end of lower standpipe 14, and a weakening annular groove 66 is provided around the exterior of the upper standpipe immediately above its lowermost end portion to insure that the upper standpipe will break off in horizontal alignment with this annular groove 66 if and when the hydrant is struck with a car, truck or similar moving vehicle or the like.

In order to provide for a separation or fracture of the main valve control rod 36 at the same time as the upper standpipe is broken off by excessive impact, a semi-cylindrical frangible coupling sleeve 68 is fastened to the lowermost end portion of the upper rod section 58 through the instrumentality of a stud 70 which passes through the upper rod section 58 and a nut 72. The frangible coupling sleeve 68 is fastened to an upper portion of the lower rod section 56 through the instrumentality of a stud 74 passing through lower rod section 56 and a nut 76. The frangible coupling sleeve 68 is provided with an area 78 of very substantially reduced cross section in order to insure that failure will occur in that area upon impact of a moving vehicle or the like on the upper standpipe of the hydrant.

This much of the disclosure was fully set out and described in our U.S. Pat. No. 3,586,019. In that patent, we called for an additional identical frangible coupling sleeve such as 68 to be fastened to the abutting ends of the upper and lower rod sections through the instrumentality of the same studs 70 and 74 and additional nuts such as 72 and 76.

In cases where a foreign object became lodged between the valve and the valve seat in the lower fitting, however, rotation of the operating nut would not be effective to shut off the flow of water, and excessive torque exerted on this nut 46 could cause the frangible coupling sleeve such as 68 to fracture. Where the operating nut was then rotated in the opposite direction to move the hydrant valve away from the valve seat far enough to let the foreign object be flushed out from between the valve and seat (in the manner recommended in the operating instructions accompanying the hydrant), the pressure of water in the main and in the lower fitting would allow the hydrant valve 34 to close against the valve seat 30 after the operating nut had been rotated in direction to raise the upper valve rod section 58 and the ragged edges of the frangible coupling sleeves 68 attached to that valve up out of the way of the lower valve rod sections. In this situation, there would be no further connection between the upper rod section 58 and the lower rod section 56, and so the operator could continue to rotate the operating nut 46 until such time as the top stop nut 62 came into contact with the lower edge of the lower nut section 54.

With its connection to the lower rod section 56 now gone, there was no further positive limitation to rotation on the part of the upper rod secton 58. Consequently, when the valve operating nut 46 was turned, for example in an energency, to try to open the hydrant valve 34, the upper rod section 58 could rotate with the lower nut section 54 in which it was threadably mounted, this resulting in no vertical movement of the upper rod section 58, and consequently no possibility of vertical movement of lower rod section 56 to open the hydrant valve.

Furthermore, in the situation where the various seals along the central portions of upper rod section 58 were provided sufficient friction to insure that the upper rod section did not rotate and this did move down vertically, there was the possibility or probability of misalignment of the upper and lower rod sections 58 and 56, with the consequent result that the upper section would "miss" the lower section as it went down and so there would be no opening of the hydrant valve 34.

To alleviate this condition, the structure of the present invention was developed. This structure includes a semi-cylindrical slotted coupling sleeve 80 permanently fixedly fastened to the lowermost end of the upper rod section 58 by the same stud 70 which fastens the upper portion of the frangible coupling sleeve 68, and by an additional nut 73. This slotted coupling sleeve 80 is provided with a downwardly opening slot 82 which, as shown, encompasses the stud 74 on the other side of an upper portion of the lower valve rod section 56. Any kind of outwardly projecting retention means could be used to replace the stud 74; or the slot could be provided in the upper portion of the lower rod with the retention means being mounted on the lower end of the coupling sleeve such as 80. Similarly, the outwardly projecting retention means could extend from a coupling sleeve like the sleeve 80 and the slot could be provided in one of the rods to receive that retention means. As shown, however, a nut 84 is threadably mounted on stud 74 and is sufficiently tight against the slotted sleeve to normally maintain its position, but is not so tight as to prevent the slotted coupling sleeve 80 from pulling off of and away from the lower valve rod section 56 in the event that upper portions of the hydrant 10 are struck by a car or truck or the like to cause the frangible coupling sleeve 68 and the upper standpipe 20 to break off as intended.

With the parts positioned as seen in FIG. 1, when the upper standpipe and/or nozzle section of the hydrant 10 is impacted with sufficient violence to cause damage the semi-cylindrical frangible coupling sleeve 68 will break along the area 78 of substantially reduced cross section, and the upper standpipe will break along the annular groove 66 therein, the upper standpipe and the lower rod section tending to pivot away from the lower standpipe and the lower rod section about a point along the annular groove 66 opposite from the point of impact. This will cause the upper rod section 58 to move somewhat to the side, but longitudinally away from the lower valve rod section 56, causing the semi-cylindrical slotted coupling sleeve 80 to slide off of stud 74 and out of contact with the lower rod section 56. Thus substantial damage to any of the parts except the upper standpipe and the frangible coupling sleeve 58 will have been prevented. These parts can be quickly and easily replaced and the hydrant put back into service.

With the parts positioned as seen in FIG. 1, any further rotation of the valve operating nut 46 to tend to pull the hydrant valve 34 more tightly up against the valve seat 30 (whether from carelessness, abuse, or because a foreign particle is trapped between the valve and valve seat thus not allowing shutoff), will cause the semi-cylindrical frangible coupling sleeve 68 to fracture along the line or area 78 of substantially reduced cross section. As soon as this takes place, additional rotation of the valve operating nut 46 will cause the upper rod section 58 to move vertically with respect to the lower rod valve section 56 until stop nut 62 comes into contact with the lowermost surface of lower nut section 54. The slot 82 of semi-cylindrical slotted coupling sleeve 80 will move upwardly with respect to the stud 74, and this stud and slotted coupling sleeve will prevent rotation of the upper rod section 58 with respect to the lower rod section 56. The parts will, then, arrive at a position as seen in FIG. 3. At this point, the operator may or may not know that the frangible coupling sleeve 68 has failed, but this is not important inasmuch as the hydrant will properly operate to provide water therethrough when next it is called on in an emergency situation or otherwise.

When this next need for water arises, the valve operating nut 46 will be turned in direction to open the hydrant valve 34, and the upper valve rod section 58 will be restrained from rotating by the sleeve 80, stud 74 and the lower rod section 56, so that the slot 82 will move down on stud 74 until it bottoms on the stud and/or until the upper rod section and the part of the frangible coupling sleeve attached to it come into bearing relationship with the lower valve section and the part of the frangible coupling sleeve 68 remaining connected to it. From this point, the hydrant valve will be forced into an open position by further downward movement in concert by the upper and lower rod sections 58 and 56. Thus water will be supplied into the lower and upper standpipes and through the nozzle section and out of a nozzle 86 after a nozzle cap 88 has been removed.

If the hydrant valve 34 has been moved far enough into the stream of water flowing from the water main, through the bottom fitting 12, and the standpipes so that there is no appreciable upward force on it due to this flow of water, when the valve operating nut 46 is again operated to move the upper valve rod section 58 in upward direction, the lower valve rod section 56 and the hydrant valve 34 will not necessarily move up, and, if it does not, the flow of water to the hydrant will not be cut off. At this point, however, the emergency will have passed, an auxiliary valve can be closed and the hydrant repaired without undue inconvenience. Referring now to FIGS. 5 and 6, in a second form of the invention, an upper valve rod section 58 is bolted to a lower valve rod section 56 through the instrumentality of a semi-cylindrical frangible coupling sleeve 68, studs 70 and 74 and nuts 72 and 76 in the same manner as described in connection with the first form of the invention. However, the semi-cylindrical slotted coupling sleeve 80 is replaced with a semi-cylindrical slotted coupling sleeve 90 which is bolted to the upper rod section 58 through the instrumentality of stud 70 and nut 73. The slotted coupling sleeve is provided with a downwardly opening slot 92, but a frangible web 94 is integral with the coupling sleeve and extends across the slot 92 at position as shown in FIGS. 5 and 6.

In normal operation, this web, along with the top portion of the other surfaces of the coupling sleeve 90 defining the slot 92, come in contact with the stud 74, and allow the slotted sleeve 90 to assist the frangible coupling sleeve 68 in withstanding the normal strains to be transmitted between upper rod section 58 and lower rod section 56.

Under violent impact, the web 94 will fail and be cleared out of the slot 92 by the stud 74 at the same time that the frangible coupling sleeve 68 is failing at reduced area 78. The structure will then be repaired in the same manner as set out in connection with the first form of the invention.

Should the frangible coupling sleeve 68 break due to carelessness, abuse, or due to excessive force attempting to shut the hydrant valve, the web 94 in slot 92 of slotted coupling sleeve 90 would also break or fail without damage to the remainder of the coupling sleeve. This insures the integrity of the slotted coupling sleeve and would then allow it to operate as set out above in connection with the first form of the invention as the upper rod section 58 moved away from the lower rod section and as the upper rod section moved toward and against the lower rod section when it is desired to open the flow of water through the hydrant.

The embodiments of the invention in which an exclusive property or privilege is claimed are defined as follows:

1. In a hydrant having a bottom housing; a valve seat in said housing; a hydrant valve operably associated with said valve seat and movable vertically between a first upper closed position in sealing relation to said seat and a second lower open position in spaced relation to the seat; a breakaway standpipe extending upwardly from said housing in surrounding relation to said valve seat; a nozzle section extending outwardly of said standpipe and including at least one nozzle; a main valve control rod including a lower valve rod section extending upwardly from said valve, an upper valve rod section extending upwardly from said lower rod section and in axial alignment therewith, and breakaway coupling means coupling said upper and lower rod sections to each other; and valve operating means operable from outside said nozzle section to move said upper rod section between upper and lower finite limits in an upward direction to cause said valve to move to said first closed position and in downward direction to cause said valve to move to said second open position; the improvement in said breakaway coupling means wherein said coupling means includes:

A. a first frangible sleeve fixedly positioned with respect to a lower end of an upper rod section and fixedly positioned with respect to an upper end of a lower rod section to maintain said rod sections in fixed, axially aligned relationship to each other, said sleeve being breakable under overload conditions to release said rod sections from each other;

B. a second non-frangible sleeve fixedly positioned with respect to one of said ends of one of said rod sections;

C. retention means extending transversely outwardly from the other of said rod sections;

D. said second sleeve being provided with an open ended slot encompassing said retention means and extending in longitudinal alignment with said rod sections to the end of said second sleeve opposite said one rod section, said second sleeve being of sufficient length that said slot continues to encompass said retention means when said lower rod section and a hydrant valve attached to said lower rod section are in a closed, upward position and as said upper rod section is moved by a valve operating means between finite upper and lower limits.

2. The coupling of claim 1 wherein said retention means is in the form of a stud which is externally threaded and a nut is threadably mounted on said stud and bears against said second sleeve to snugly hold said sleeve between said nut and said other of the rod sections while permitting longitudinal movement of said second sleeve with respect to said stud.

3. The coupling of claim 1 wherein said non-frangible second sleeve includes a frangible web extending across the slot in position to cooperate with the walls of the second sleeve which define the slot to fixedly position the retention means with respect to the sleeve, said web being breakable under overload conditions to allow the retention means and the second sleeve to slide relative to each other with the retention means in the slot.

4. In a hydrant having a bottom housing; a valve seat in said housing; a hydrant valve operably associated with said valve seat and movable vertically between a first upper closed position in sealing relation to said seat and a second lower open position in spaced relation to the seat; a breakaway standpipe extending upwardly from said housing in surrounding relation to said valve seat; a nozzle section extending outwardly of said standpipe and including at least one nozzle; a main valve control rod including a lower valve rod section extending upwardly from said valve, an upper valve rod section extending upwardly from said lower rod section and in axial alignment therewith, and breakaway coupling means coupling said upper and lower rod sections to each other; and valve operating means operable from outside said nozzle section to move said upper rod section between upper and lower finite limits in an upward direction to cause said valve to move to said first closed position and in downward direction to cause said valve to move to said second open position; the improvement in said breakaway coupling means wherein said coupling means includes:

A. a first frangible sleeve fixedly positioned with respect to a lower end of an upper rod section and fixedly positioned with respect to an upper end of a lower rod section to maintain said rod sections in fixed, axially aligned relationship to each other, said sleeve being breakable under overload conditions to release said rod sections from each other;

B. a second non-frangible sleeve fixedly positioned with respect to one of said ends of one of said rod sections;

C. said second sleeve and the other of said rod sections cooperating to provide means for restraining the rotation of said rod sections, one with respect to the other while allowing longitudinal movement of said rod sections one with respect to the other, said restraining means including:
1. retention means extending transversely outwardly from one of said second sleeve and said other rod section,
2. the other of said second sleeve and said other rod section being provided with an open ended slot encompassing said retention means and extending in longitudinal alignment with said rod sections to the end of the other of said second sleeve and other rod section, said second sleeve being of sufficient length that said slot continues to encompass said retention means when said lower rod section and a hydrant valve attached to said lower rod section are in a closed, upward position and as said upper rod section is moved by a valve operating means away from said lower finite limit and to said upper finite limit.

* * * * *